(12) United States Patent
Nakano

(10) Patent No.: US 8,832,194 B2
(45) Date of Patent: Sep. 9, 2014

(54) INFORMATION PROCESSING APPARATUS, CONTROL METHOD, AND STORAGE MEDIUM

(75) Inventor: Yu Nakano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/540,443

(22) Filed: Jul. 2, 2012

(65) Prior Publication Data
US 2013/0060854 A1    Mar. 7, 2013

(30) Foreign Application Priority Data

Jul. 8, 2011   (JP) ................. 2011-151437

(51) Int. Cl.
*G06F 15/16*    (2006.01)
*G06Q 50/00*    (2012.01)
*H04N 1/00*    (2006.01)
*G06Q 10/10*    (2012.01)

(52) U.S. Cl.
CPC .............. *G06Q 10/101* (2013.01); *G06Q 50/01* (2013.01); *H04N 1/00153* (2013.01)
USPC .......................................... 709/204; 709/205

(58) Field of Classification Search
CPC .................. H04N 1/00153; H04N 1/00156
USPC ............ 709/200–205, 217–227, 228
See application file for complete search history.

(56) References Cited

U.S. PATENT DOCUMENTS

| | | | | |
|---|---|---|---|---|
| 7,092,966 | B2 * | 8/2006 | McIntyre | 1/1 |
| 7,213,206 | B2 * | 5/2007 | Fogg | 715/706 |
| 7,533,129 | B2 * | 5/2009 | McIntyre | 1/1 |
| 8,327,253 | B2 * | 12/2012 | Han et al. | 715/202 |
| 8,396,813 | B2 * | 3/2013 | Gaucas et al. | 705/319 |
| 8,560,962 | B2 * | 10/2013 | Wang et al. | 715/789 |
| 2008/0201201 | A1 * | 8/2008 | Pousti et al. | 705/10 |
| 2010/0106573 | A1 * | 4/2010 | Gallagher et al. | 705/14.4 |
| 2012/0066573 | A1 * | 3/2012 | Berger et al. | 715/202 |
| 2012/0323737 | A1 * | 12/2012 | Pousti et al. | 705/26.61 |
| 2013/0083364 | A1 * | 4/2013 | Gaucas et al. | 358/1.18 |
| 2013/0159445 | A1 * | 6/2013 | Zonka et al. | 709/206 |
| 2013/0262588 | A1 * | 10/2013 | Barak et al. | 709/204 |
| 2013/0314566 | A1 * | 11/2013 | Walker et al. | 348/231.3 |

FOREIGN PATENT DOCUMENTS

| | | |
|---|---|---|
| JP | 2003-186903 A | 7/2003 |
| JP | 2006-235905 A | 9/2006 |
| JP | 2007-34743 A | 2/2007 |
| JP | 2007-52557 A | 3/2007 |
| JP | 2010-204738 A | 9/2010 |

* cited by examiner

*Primary Examiner* — Moustafa M Meky
(74) *Attorney, Agent, or Firm* — Canon U.S.A., Inc. IP Division

(57) ABSTRACT

An information processing apparatus and method that provides for automatically suggesting and delivering content based on a relationship between a user and a person to whom the content is to be delivered.

12 Claims, 16 Drawing Sheets

FIG.3

| DELIVERY ID | NOTIFICATION DATE | NOTIFICATION RECIPIENT | DELIVERY TARGET DATE | MERCHANDISE RECIPIENT | USED PHOTOGRAPH ID | USED MERCHANDISE TYPE | RELATIONSHIP BETWEEN NOTIFICATION RECIPIENT AND MERCHANDISE RECIPIENT |
|---|---|---|---|---|---|---|---|
| 001 | 20110101 | UserID 001 | 20110103 | UserID 002 | IMG0001.jpg, IMG0012.jpg | photobook 001 | COMMON SCHEDULE |

| PROFILE IMAGE | |
|---|---|
| USER ID | ID0001 |
| USER NAME | TARO KIYANO |
| SEX | MALE |
| DATE OF BIRTH | JANUARY 1, 1985 |
| RESIDENCE | TOKYO-TO, JAPAN |
| ANNIVERSARY | JANUARY 1 (WEDDING ANNIVERSARY) |
| SELF INTRODUCTION | I LIKE CAMERAS, AND ON LONG WEEKENDS I OFTEN GO ON PHOTO TRIPS. I MAINLY LIKE TO TAKE PHOTOGRAPHS OF ANIMALS. |

FIG. 8

| DELIVERY TARGET DATE | COMMON SCHEDULE RELATIONSHIP | MESSAGE RELATIONSHIP | GROUP RELATIONSHIP | SELF | NO SETTING |
|---|---|---|---|---|---|
| | AFTER PREDETERMINED PERIOD HAS ELAPSED FROM FINISH DATE OF COMMON SCHEDULE | ANNIVERSARY/ BIRTHDAY | ANNIVERSARY/ BIRTHDAY | AFTER PREDETERMINED PERIOD HAS ELAPSED FROM FINISH OF SCHEDULE/ ANNIVERSARY/BIRTHDAY | ANNIVERSARY/ BIRTHDAY |

FIG.10

| USER ID | USER NAME |
|---------|-----------|
| ID0001 | TARO KIYANO |
| ID0009 | HANAKO KIYANO |
| ID0069 | YATARO NOKI |

FIG.11

| GROUP ID | GROUP NAME |
|---|---|
| GR002 | CALL FOR CAMERA LOVERS |
| GR004 | TOKYO-TO LOCAL TOPICS |
| GR096 | LIMITED TO THOSE BORN ON NEW YEAR'S DAY |

FIG.12

| ITEM | EXAMPLE |
|---|---|
| TRANSMISSION TIME | 17:18 APRIL 1, 2005 |
| DESTINATION | ID0009 |
| TEXT BODY | PLEASE VIEW THE PHOTOGRAPHS TAKEN DURING THE TRIP THE OTHER DAY |
| ATTACHED FILE | IMG1001.JPG |

FIG.13

| ITEM | EXAMPLE |
|---|---|
| POSTING TIME | 17:20 APRIL 1, 2005 |
| SUBJECT | PHOTOGRAPHY TRIP TO OKINAWA |
| TEXT BODY | WENT TO OKINAWA DURING SPRING VACATION ON A PHOTOGRAPHY TRIP. THE WEATHER WAS GREAT, AND WAS ABLE TO REALLY RELAX. |
| ATTACHED FILE | IMG1001.JPG |

FIG.14

| ITEM | EXAMPLE |
|---|---|
| SUBJECT | PHOTOGRAPHY TRIP TO OKINAWA |
| START DATE | MARCH 20, 2005 |
| FINISH DATE | MARCH 23, 2005 |
| EVENT LOCATION | NAHA CITY, OKINAWA PREFECTURE |
| ACCOMPANYING PERSONS | ID0069 |
| CONTENTS | 3-DAY 2-NIGHT TRIP TO OKINAWA WITH A FRIEND |

FIG.15

| ITEM | EXAMPLE |
|---|---|
| UPLOAD DATE AND TIME | 17:25 APRIL 1, 2005 |
| CREATED DATE AND TIME | 9:15 MARCH 23, 2005 |
| TITLE | AT OKINAWA AIRPORT |
| TAG | TRAVEL |
| | OKINAWA AIRPORT |
| | CANON EOS KISS X5 |
| NUMBER OF VIEWS | 10 |
| NUMBER OF TIMES EVALUATION BUTTON HAS BEEN PRESSED | 8 |
| COMMENTS — POSTER | ID0009 |
| COMMENTS — POSTING TIME | 17:55 APRIL 1, 2005 |
| COMMENTS — CONTENTS | ATMOSPHERE UNIQUE TO OKINAWA |

INFORMATION PROCESSING APPARATUS, CONTROL METHOD, AND STORAGE MEDIUM

BACKGROUND OF THE INVENTION

1. Field of the Invention

The present invention relates to an information processing apparatus that delivers contents.

2. Description of the Related Art

Recently, services delivering photographs taken on, for example, anniversaries as photograph merchandise edited into an album, a poster, a slideshow and the like have increased. However, when utilizing such a photograph merchandise delivery service, it is necessary to view and compare a very large number of photographs in order to determine suitable photographs, which results in the user performing complicated and troublesome operations.

Such a photograph selection operation places a very large burden on the user, and is a reason that many users may avoid utilizing photograph merchandise delivery services.

Japanese Patent Application Laid-Open No. 2003-186903 discusses a technology for reducing the burden on users of such a content delivery services, where the user receives content that matches a selection condition specified in advance by the user at a user-specified timing. Consequently, the user can receive desired content in an edited format at a desired timing.

Further, Japanese Patent Application Laid-Open No. 2006-235905 discusses a technology in which suitable music for a slideshow is selected based on comments about a photograph provided from a user.

However, in both Japanese Patent Application Laid-Open Nos. 2003-186903 and 2006-235905, the user needs to input a selection condition or a comment about the content to be delivered before delivery. Accordingly, there is room for improvement to reduce the burden on the user from content generation until the edited photograph merchandise is received.

Further, since Japanese Patent Application Laid-Open Nos. 2003-186903 and 2006-235905 do not consider the interests and tastes of the user or relationships with other people, the selected content may not be appropriate for the user.

For example, in Japanese Patent Application Laid-Open Nos. 2003-186903 and 2006-235905, if the user wishes to give an album to a friend as a present, the user has to input what kind of relationship the user has with his friend and what kind of image the friend desires as a condition.

SUMMARY OF THE INVENTION

An aspect of the present invention is directed to an information processing apparatus and a control method capable of delivering content based on a relationship between a user and another person while reducing the burden on the user.

According to an aspect of the present invention, an information processing apparatus includes a memory and a processor, connected to the memory, the processor configured to control a determination unit configured to determine a relationship between a user and a person to whom content is to be delivered, a selection unit configured to select the content based on a content selection condition that is based on the relationship determined by the determination unit, and a delivery unit configured to deliver the content selected by the selection unit to the user or the person.

According to the following exemplary embodiments, content for a person having a relationship with a user can be automatically selected and delivered.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating an example of a photograph merchandise delivery table according to an exemplary embodiment.

FIG. 8 is a table illustrating a relationship between an association and a delivery target date.

FIG. 10 is a table illustrating an example of friend information.

FIG. 11 is a table illustrating an example of information about groups a user participates in.

FIG. 12 is a table illustrating an example of message information.

FIG. 13 is a table illustrating an example of diary information.

FIG. 14 is a table illustrating an example of schedule information.

FIG. 15 is a table illustrating an example of content information.

DESCRIPTION OF THE EMBODIMENTS

Various exemplary embodiments, features, and aspects of the invention will be described in detail below with reference to the drawings.

The configuration illustrated in the following exemplary embodiment is merely one example. The present invention is in no way limited to the illustrated configuration.

Figure 1:
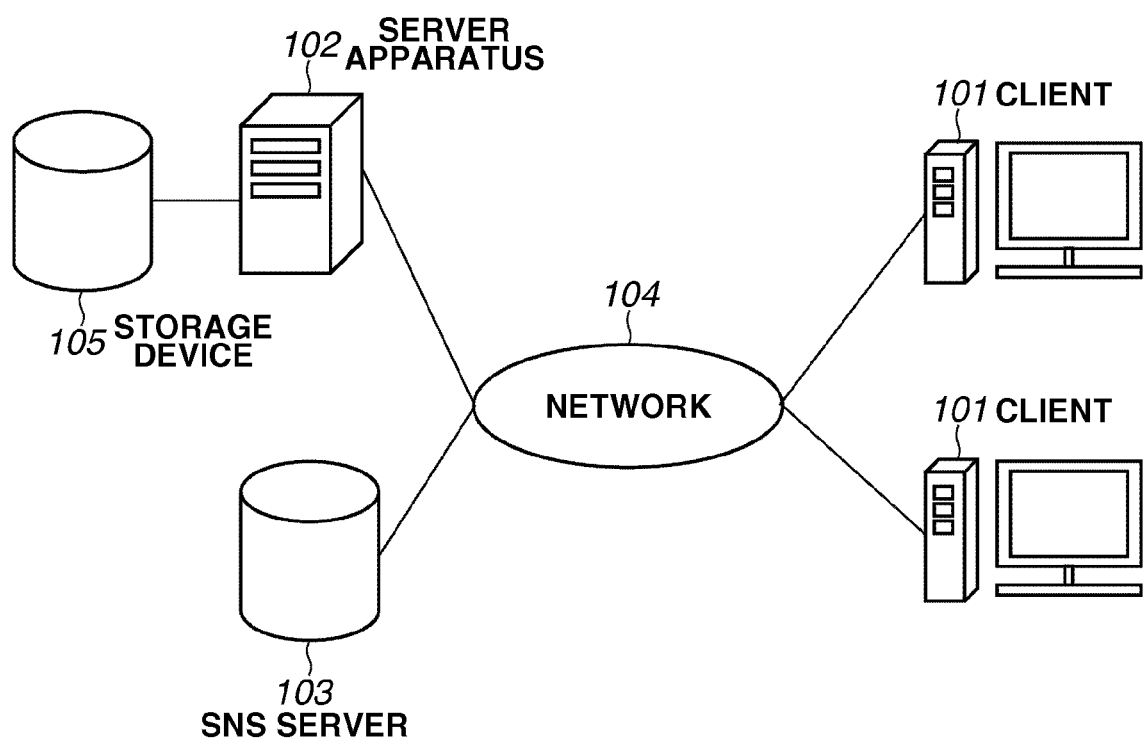
FIG. 1 illustrates an example of a configuration of a photograph merchandise suggestion system according to an exemplary embodiment.

FIG. 1 illustrates a configuration of a photograph merchandise suggestion system for performing a content suggestion according to an exemplary embodiment of the present invention. The exemplary embodiment will be described based on an example in which the suggested content is photograph (image) merchandise.

A client 101 is an information processing apparatus that receives a suggestion about photograph merchandise from the photograph merchandise suggestion system according to the exemplary embodiment via a network 104. A server apparatus 102 is an information processing apparatus that automatically suggests photograph merchandise to the client 101 at an appropriate timing, and delivers the photograph merchandise.

The server apparatus 102 acquires information required for delivering the photograph merchandise from a social networking service (SNS) server 103 via the network 104.

The SNS server 103 is an information processing apparatus that has a Web server function for providing a social networking service (SNS) on the network 104.

The SNS according to the exemplary embodiment allows each user to upload images and blogs (a diary) onto the SNS, and leave evaluations and comments about the uploaded images and other users. Further, the SNS is a service that provides a place for users to communicate with each other via activity over the network (the SNS).

Each user can register a profile including the user's birthday and occupation, a schedule, a diary, etc., and allow other users to see such information. Further, SNS users can set other users as "friend" or "like", and can exchange messages among themselves.

Users can also post content such as photographs, and allow other users to see it. This content is commented on and evaluated by other users. In addition, on the SNS, users can build "groups" calling for users having common interests, tastes, or attributes.

Also, users can participate in "groups" built by other users.

The SNS server 103 providing such an SNS includes a function for outputting to another apparatus information indicating activity by the user corresponding to an input identification (ID) on the network of the SNS when the SNS server 103 receives a request including input of an ID that uniquely identifies the user of this SNS from another apparatus.

Examples of information indicating activity by the user on the network of the SNS output by the SNS server 103 are illustrated in FIG. 6 and FIGS. 10 to 15.

Figure 6:
FIG. 6 is a table illustrating an example of profile information.

FIG. 6 illustrates profile information about an SNS user, which was registered by the user. The profile may include a profile image, a user ID, a user name, the user's sex, date of birth, residence, an anniversary, a self-introduction, and the like.

FIG. 10 illustrates an example of friend information. This friend information includes a list of the user IDs and user names of other users who have been set as friends by the user on the SNS.

FIG. 11 illustrates group information indicating a list of the group IDs and group names of the groups that the user participates in. The SNS server 103 can provide a list of the user IDs and user names of the participants of a group to another apparatus based on a request from the other apparatus that includes an ID which can uniquely identify a group.

FIG. 12 illustrates message information relating to messages sent and received by the user on the SNS. The message information includes a transmission date and time (reception date and time), destination (transmission source), a text body, and an attached file.

FIG. 13 illustrates diary information relating to a diary uploaded by the user of the SNS onto the SNS. The diary information may include a posting date and time, a subject, a text body, and an attached file.

FIG. 14 illustrates schedule information relating to a schedule registered by the user of the SNS. The schedule information may include a schedule subject, a start date, a finish date, an event location, names of accompanying persons, and content information.

FIG. 15 illustrates content information, which is an attribute relating to content uploaded to the SNS by the user. This content information may include an upload date and time, a generation date and time, a title, a tag, a user ID of the user who posted a comment about the content, a posting date and time of the posted comment, the comment subject matter, and the number of times an evaluation button has been pressed.

A plurality of comments can be attached to a single piece of content on the SNS. When the SNS user has viewed content posted by another user (or by the user), if the SNS user likes that content the user presses an evaluation button provided as an SNS function.

Further, for photographs, the name of the photographic subject, the photographing location, and the equipment to be used for the photography are information set in the content as tags. The tags are set based on inputs from the user on the SNS.

The SNS server 103 may also automatically set the tags based on metadata in the uploaded content. Examples of the "content" include data such as image data (photographs), moving image data, and music data.

As described above, the SNS server 103 can store information indicating activity by the user on the SNS network, and provide such information to another apparatus.

The server apparatus 102 acquires, from the SNS server 103, this information indicating activity by the user on the SNS network based on the user ID on the SNS for the user of the photograph merchandise suggestion system.

The server apparatus 102 determines a timing for suggesting photograph merchandise based on the acquired activity of the user on the SNS. Further, the server apparatus 102 determines the merchandise recipient, i.e., the person to whom the photograph merchandise will actually be provided.

In addition, the server apparatus 102 determines the content (image) to be used for the photograph merchandise subject matter based on a relationship between the user and the merchandise recipient. The server apparatus 102 notifies the client 101 of a photograph merchandise suggestion corresponding to the user to whom the photograph merchandise is to be suggested about this determined information as suggestion information.

A storage device 105 stores the information acquired from the SNS and suggestion information relating to photograph merchandise delivery. The storage device 105 can be included in the server apparatus 102 or can be connected to the server apparatus 102 as an external device.

As described above, examples of the information indicating activity on the SNS network by the user include messages sent and received by the user, a schedule registered by the user, content evaluations, user attributes (a profile and group information), and the like.

The system illustrated in FIG. 1 is merely an example, and the exemplary embodiment(s) is not limited to this. For example, as long as the client 101 is a terminal having a connection function to the network 104, the client 101 may be a personal computer or a smartphone.

The server apparatus 102 may acquire information from a plurality of SNS servers 103. Further, the server apparatus 102 may provide the SNS instead of the SNS server 103. The network 104 may be an interconnected network to which a plurality of networks is connected or a network having a limited range, such as within a company.

Figure 2:
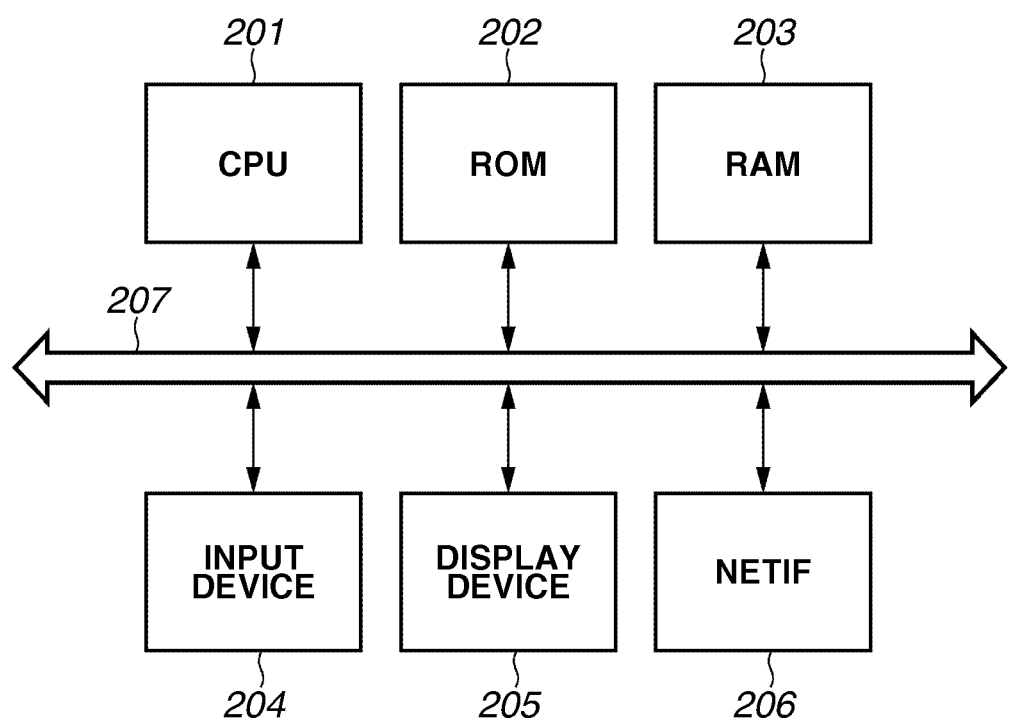
FIG. 2 is a block diagram illustrating a hardware configuration of an information processing apparatus according to an exemplary embodiment.

FIG. 2 illustrates a representative hardware configuration of the client 101 and the server apparatus 102 in the photograph merchandise suggestion system according to the exemplary embodiment.

A central processing unit (CPU) 201 executes overall control of the client 101/server apparatus 102. The CPU 201 controls each device connected to a bus 207. Further, the CPU 201 realizes the below-described processing based on control of the respective hardware units and information calculation by executing a below-described program stored in a read-only memory (ROM) 202.

The CPU 201 in the server apparatus 102 realizes the various processes illustrated in the flowcharts of FIGS. 4, 5, 7, and 9, which will be described below, by executing programs.

A random access memory (RAM) 203 stores the execution programs themselves and the data needed for the execution programs as a work memory for the CPU 201. The ROM 202 records a processing procedure of the CPU 201.

The ROM 202 includes a program ROM in which the basic software (operating system) for performing basic control of the computer is recorded, and a data ROM in which the data necessary for the computer to perform the processing is recorded. The ROM 202 in the server apparatus 102 stores programs for realizing the flowcharts illustrated in FIGS. 4, 5, 7, and 9.

An input device 204 physically receives inputs from the user, and typically consists of, for example, a keyboard or a mouse. A display device 205 displays computer processes, and typically consists of, for example, a liquid crystal display. A network interface (hereinafter, "NETIF") 206 controls the exchange of information with external devices connected via a network.

Operation of the above-described photograph merchandise suggestion system according to the exemplary embodiment will now be described. The photograph merchandise suggestion system according to the exemplary embodiment suggests photograph merchandise about an appropriate photograph subject matter at an appropriate timing based on information indicating user activity on the network of the SNS.

In the exemplary embodiment, the photograph merchandise suggestion system performs a suggestion to the user to give photograph merchandise to a person set as a friend on the SNS by the user. Further, the photograph merchandise suggestion system suggests photograph merchandise for the user.

Figure 4:
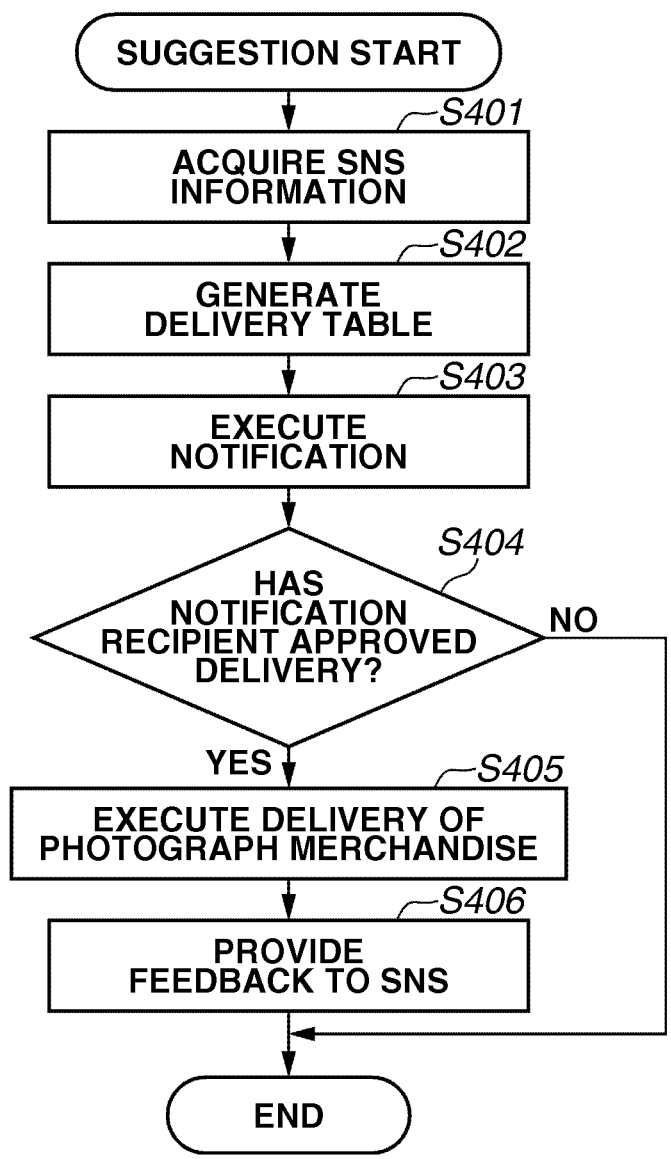
FIG. 4 is a flowchart illustrating an overall operation of a photograph merchandise suggestion system according to an exemplary embodiment.

FIG. 4 is a flowchart illustrating processing performed in the server apparatus 102 that suggests and delivers photograph merchandise according to the exemplary embodiment.

In step S401, the server apparatus 102 acquires from the SNS server 103 information indicating activity by the user of the photograph merchandise suggestion system on the network of the SNS and information relating to the content to be used for the suggested photograph merchandise. The processing performed in step S401 will be described referring to a flowchart illustrated in FIG. 5.

In step S402, the server apparatus 102 generates a photograph merchandise delivery table based on the acquired information indicating activity by the user on the network of the SNS. FIG. 3 illustrates an example of the photograph merchandise delivery table generated in step S402.

The photograph merchandise delivery table illustrated in FIG. 3 is configured from a delivery ID, a notification date, a notification recipient, a delivery target date, a merchandise recipient, a used photograph ID to be used for the photograph merchandise, a used merchandise type to be suggested, and a relationship between the notification recipient and the merchandise recipient.

The delivery ID item stores a delivery ID that is uniquely set for each delivery. The date on which the notification recipient is to be notified is stored in the notification date item. The notification date is set as a fixed number of days before the set delivery target date.

The notification recipient item stores the user ID of the notification recipient who will receive the photograph merchandise suggestion notification. The delivery target date stores the date on which the photograph merchandise suggestion system assumes that the photograph merchandise is to be actually sent to the merchandise recipient. For example, when the photograph merchandise suggestion system suggests photograph merchandise for the birthday of a friend of the user, the friend's birthday is set as the delivery target date.

When the photograph merchandise suggestion system directly delivers the photograph merchandise to the merchandise recipient without going via the notification recipient, delivery is performed on the set delivery target date. The merchandise recipient item stores the user ID of the merchandise recipient receiving the photograph merchandise.

Regarding the user ID of the notification recipient and the merchandise recipient, the user ID that is used by the SNS server 103 may be used as is. Alternatively, a user ID that is uniquely defined in the photograph merchandise suggestion system according to the exemplary embodiment may be used.

The used photograph ID item stores information for identifying the photographs to be used for the photograph merchandise. The file name of the photograph may be stored, or a photograph ID attached in the SNS during upload of the photograph to the SNS may be used. The processing for determining the used photograph will be described referring to the flowchart illustrated in FIG. 9.

The used photograph merchandise type item stores information about the output type of photograph merchandise. This item may include output type information such as an album, slideshow, mug cup, and t-shirt, as well as information about the number of pages in the album or album decoration.

In the item indicating the relationship between the notification recipient and the merchandise recipient, a relationship between the notification recipient and the merchandise recipient determined based on the acquired information indicating activity by the user on the network of the SNS is set. Based on the relationship between the user (notification recipient) and the merchandise recipient, the used photograph is determined. The processing for setting the relationship between the notification recipient and the merchandise recipient will be described below referring to FIG. 7.

In step S403, the server apparatus 102 transmits a suggestion notification based on the generated photograph merchandise delivery table. The server apparatus 102 arranges (lays out) the image to be used in a template for each merchandise based on the generated photograph merchandise delivery table, and completes the merchandise.

Further, the server apparatus 102 generates a preview display file of the merchandise based on the generated merchandise. A reduced-resolution image of the image to be used is used as a merchandise preview display, or for merchandise having a plurality of pages, a partial extract is generated.

The server apparatus 102 notifies the notification recipient, who is the user of the photograph merchandise suggestion system, of a photograph merchandise suggestion. If the notification recipient and the merchandise recipient are the same person, the photograph merchandise suggestion system suggests photograph merchandise tailored for the user (the notification recipient and the merchandise recipient).

If the notification recipient and the merchandise recipient are not the same, the photograph merchandise suggestion system suggests to the user (notification recipient) gift photograph merchandise targeted at the merchandise recipient.

The server apparatus 102 transmits the notification of a photograph merchandise suggestion to the user, who is the notification recipient, by, for example, electronic mail (E-mail). The method for transmitting the notification is not limited to electronic mail, and any method enabling practice of the exemplary embodiment is applicable. The photograph merchandise suggestion notification may be sent with a web page uniform resource locator (URL) indicating a link destination from which the photograph merchandise preview can be viewed. The photograph merchandise suggestion notification can also be sent with the photograph merchandise preview itself.

In step S404, the server apparatus 102 determines whether the notification recipient has approved the suggested photograph merchandise, and whether to actually perform delivery. If the notification recipient wants the suggested merchandise to be delivered (YES in step S404), then in step S405, the notification recipient issues an approval as a delivery instruction.

The server apparatus 102 detects the delivery instruction by determining whether an approval was input.

The system may be configured so that approval is input on the same screen as the photograph merchandise preview display screen. The server apparatus 102 can determine whether to deliver the suggested content based on the user's response to an inquiry made to the user.

In step S405, the server apparatus 102 performs processing for delivering the photograph merchandise to the merchandise recipient. For example, if the photograph merchandise to be delivered is in an electronic file format, the server apparatus 102 transmits the generated file to the client 101 corresponding to the notification recipient via the network 104. In this case, the notification recipient transfers the photograph merchandise delivered from the server apparatus 102 to the merchandise recipient as a gift.

The server apparatus 102 may also directly deliver the photograph merchandise generated for the merchandise recipient to the client 101 corresponding to the merchandise recipient. Further, the server apparatus 102 may also directly deliver the photograph merchandise generated for the merchandise recipient to the client 101 corresponding to the merchandise recipient without obtaining approval from the notification recipient.

If the used photograph merchandise type is a print product such as an album, the server apparatus 102 transmits a photograph merchandise print command to a printing system (not illustrated), and the printed photograph merchandise is physically delivered to the notification recipient or the merchandise recipient.

In step S406, the server apparatus 102 uploads the generated photograph merchandise preview in an electronic format onto the SNS. Consequently, a large number of users can view the photograph merchandise preview on the SNS.

Further, activity among users on the SNS can be promoted by obtaining comments and evaluations on the SNS from the users about the photograph merchandise.

Figure 5:
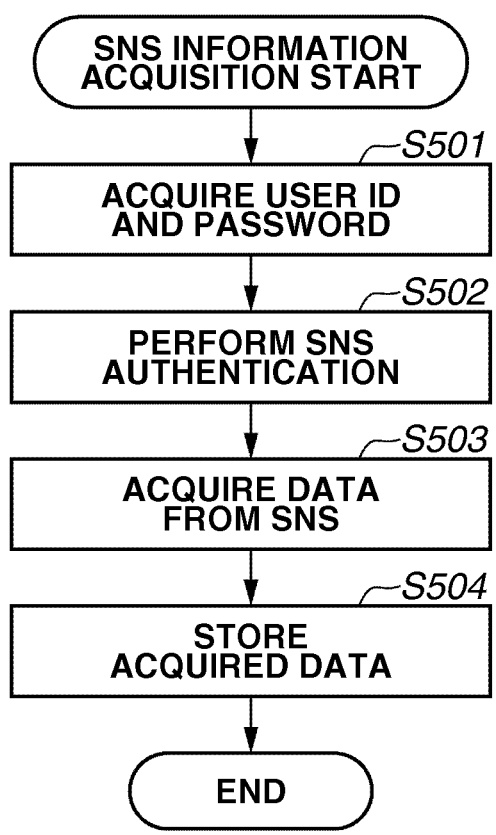
FIG. 5 is a flowchart illustrating information acquisition from a social networking service (SNS) server.

FIG. 5 is a flowchart illustrating the processing for acquiring information indicating activity by the user on the network of the SNS performed in step S401.

In step S501, the server apparatus 102 acquires the user ID and password for logging into the SNS server 103 based on inputs from the user, and stores the acquired user ID and password in the storage device 105. In step S502, the server apparatus 102 accesses the SNS server 103 via the NETIF 206, and transmits an acquisition request to the SNS server 103 for the information indicating activity on the network of the SNS using the user ID and password acquired in step S501.

In step S503, when authentication is completed, the server apparatus 102 acquires the information indicating activity on the network of the SNS from the SNS server 103. Then, in step S504, the server apparatus 102 stores the personal information and the content information acquired in step S503 in the storage device 105.

The processing for acquiring the personal information and the content information from the SNS illustrated in FIG. 5 is repeatedly executed at an arbitrary timing, and the information is updated. This is performed so that the photograph merchandise suggestion reflects the latest activity subject matter on the SNS.

Next, the processing for generating the delivery table in step S402 will be described in more detail with reference to the flowcharts illustrated in FIGS. 7 and 8.

The delivery table generation processing determines the subject matter of each item in the delivery table illustrated in FIG. 3. First, the server apparatus 102 sets the user registered in the photograph merchandise suggestion system as the notification recipient. An ID capable of uniquely identifying the user is used as the information that is set in the notification recipient item.

Next, the server apparatus 102 determines the actual merchandise recipient who will receive the photograph merchandise, and identifies the relationship between the determined merchandise recipient and the notification recipient. In the exemplary embodiment, the user (notification recipient) of the photograph merchandise suggestion system and all of the people set as friends on the SNS by the user (notification recipient) can be the merchandise recipient.

Next, the processing for determining and setting the relationship between the merchandise recipient and the user (notification recipient) will be described in more detail with reference to FIG. 7.

Setting of the relationship between the merchandise recipient and the user (notification recipient) includes classifying merchandise recipients by determining what kind of activity the user and the merchandise recipient are associated and related with on the SNS.

In step S701, the CPU 201 in the server apparatus 102 acquires information indicating activity by a person set as the merchandise recipient on the network of the SNS, and stores the acquired information in the storage device 105.

The CPU 201 acquires the user ID of the merchandise recipient on the SNS by referring to a list of the user's (notification recipient's) friends on the SNS, illustrated in FIG. 10, from the storage device 105. Then, the CPU 201 executes the SNS information acquisition processing illustrated in FIG. 5 using the user ID of the merchandise recipient on the SNS.

In the exemplary embodiment, the SNS server 103 can acquire information indicating activity on the network of the SNS of another SNS user set as a friend by authenticating the SNS ID and password of the user (notification recipient). The information indicating activity by the merchandise recipient on the network of the SNS can also be acquired by causing the user to input a password corresponding to the user ID of the merchandise recipient for the SNS and authenticating the input password.

Next, in step S702, the CPU 201 compares respectively-acquired schedule information (FIG. 14) about the user (notification recipient) and the merchandise recipient, and determines whether there is a schedule with common subject matter.

If it is determined in step S702 that there is a schedule with common subject matter in the schedule information between the user (notification recipient) and the merchandise recipient (YES in step S702), the processing proceeds to step S703. In step S703, the CPU 201 sets this merchandise recipient to "common schedule relationship". Specifically, the CPU 201 sets a flag indicating "common schedule relationship", that is stored in association with the ID of the merchandise recipient, to "ON". The process then proceeds to step S704.

If it is determined in step S702 that there is no schedule with common subject matter in the schedule information between the user (notification recipient) and the merchandise recipient (NO in step S702), the processing proceeds to step S704

In step S704, the CPU 201 determines whether the number of messages exchanged between the user (notification recipient) and the merchandise recipient on the SNS is greater than or equal to a predetermined number.

If it is determined that the number of exchanged messages is greater than or equal to the predetermined number (YES in step S704), the processing proceeds to step S705. In step S705, the CPU 201 sets the applicable merchandise recipient to "message relationship". Specifically, the CPU 201 sets a flag indicating "message relationship", that is stored in association with the ID of the merchandise recipient, to "ON". The processing then proceeds to step S706.

If it is determined that the number of exchanged messages is less than the predetermined number (NO in step S704), the processing proceeds to step S706.

In step S706, the CPU 201 determines whether the number of common participation groups is greater than or equal to a predetermined number by comparing information (FIG. 11) about the groups that the user (notification recipient) and the merchandise recipient participate in on the SNS.

If it is determined that the number of common participation groups is greater than or equal to the predetermined number (YES in step S706), the processing proceeds to step S707. If it is determined that the number of common participation groups is less than the predetermined number (NO in step S706), the processing proceeds to step S708.

In step S707, the CPU 201 sets the applicable merchandise recipient to "group relationship". The CPU 201 also sets a flag indicating "group relationship", that is stored in association with the ID of the merchandise recipient, to "ON". The processing then proceeds to step S708.

In step S708, the CPU 201 determines whether the notification recipient and the merchandise recipient currently set as the processing target are the same person. If it is determined that the notification recipient and the merchandise recipient currently set as the processing target are the same person (YES in step S708), the processing proceeds to step S709.

In step S709, the CPU 201 sets the applicable merchandise recipient to "self". Specifically, the CPU 201 sets a flag indicating "self", that is stored in association with the ID of the merchandise recipient, to "ON". The processing then proceeds to step S710.

If it is determined that the notification recipient and the merchandise recipient are not the same person (NO in step S708), the processing proceeds to step S710. In step S710, the CPU 201 determines whether the setting processing for all of the merchandise recipients has finished.

If it is determined that the setting processing for all of the merchandise recipients has not finished (NO in step S710), the processing returns to step S701, where the CPU 201 executes the processing again for the next merchandise recipient. If it is determined that the setting processing for all of the merchandise recipients has finished (YES in step S710), the CPU 201 ends the setting processing.

Depending on the merchandise recipient, some merchandise recipients may have a plurality of relationships set, while other merchandise recipients may have no relationships set. If there is a plurality of relationships set, a corresponding number of delivery tables are newly generated. More specifically, one relationship is input per delivery table. The server apparatus 102 inputs the set relationships in the respective delivery table.

Next, setting of the delivery target date will be described. FIG. 8 illustrates a relationship regarding the delivery target date corresponding to a relationship between a merchandise recipient and the user (notification recipient).

In the exemplary embodiment, a date after a predetermined period has elapsed from the finish date of the common schedule is set as the delivery target date for the merchandise recipient set in the common schedule relationship. This predetermined period is set with consideration given to the period that is required to input the information relating to the schedule on the SNS.

When directly suggesting merchandise to the user (the relationship is "self"), the anniversary or birthday input in the profile information is set as the delivery target date. Further, when directly suggesting merchandise to the user (the relationship is "self"), a date after a predetermined period has elapsed from the finish date of the respective schedules is set as the delivery target date.

This predetermined period is set while giving consideration to the period that is required to input the information relating to the schedule on the SNS. For example, consideration is given to the time it takes to upload onto the SNS a photograph taken during this schedule, post a diary article relating to this schedule, and obtain evaluations from other users.

When the above common schedule relationship or a relationship other than "self" is set, or when none of the relationships are set, an anniversary or a birthday is set as the delivery target date based on the profile information about the merchandise recipient.

Since birthdays and anniversaries come each year, the closest birthday or anniversary can be set as the delivery target date, or a birthday or anniversary for the following years can be set as the delivery target date. Further, because it is important that the photograph merchandise is reliably sent by the anniversary or birthday date, a date prior to the actual anniversary or birthday by a predetermined number of days can be set as the delivery target date.

The server apparatus 102 inputs the delivery target date determined in the corresponding delivery ID in the delivery table.

Next, the notification date is determined. The notification date is set as a predetermined period before the determined delivery target date. This causes the user (notification recipient) to determine whether to actually execute delivery of the suggested photograph merchandise to the user (notification recipient) by the delivery target date. The server apparatus 102 inputs the determined notification date in the corresponding delivery ID in the delivery table.

Figure 9:
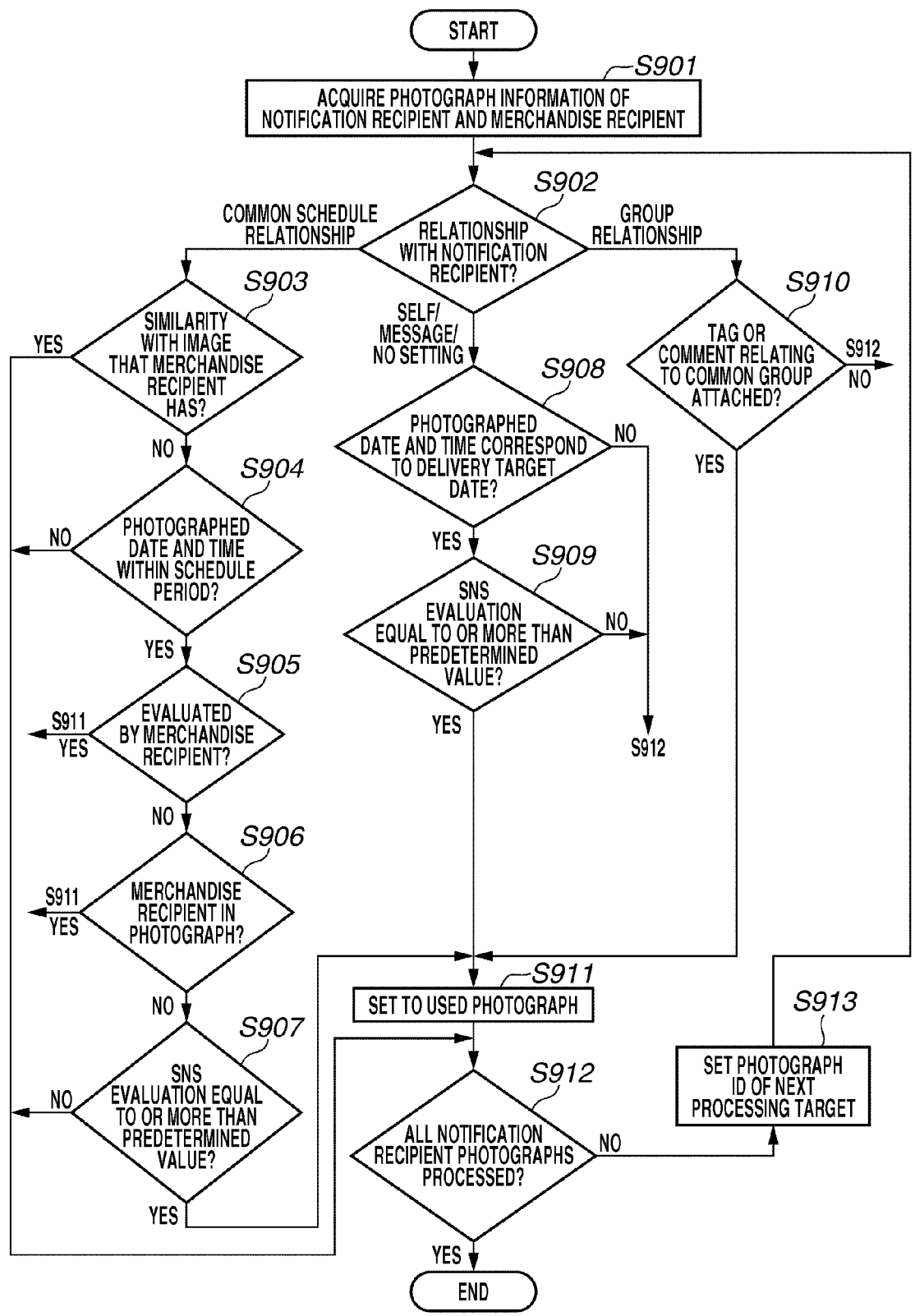
FIG. 9 is a flowchart illustrating processing for determining a photograph to be used.

Next, the server apparatus 102 determines the photograph to be used for the suggested photograph merchandise based on the set relationship between the user (notification recipient) and the merchandise recipient. FIG. 9 is a flowchart illustrating processing for determining the used photograph. This processing is performed for each deliver ID in the delivery table.

In step S901, the CPU 201 in the server apparatus 102 acquires from the storage device 105 all of the photograph information (illustrated in FIG. 15) uploaded onto the SNS server 103 by the user (notification recipient) and the merchandise recipient.

Then, the CPU 201 stores the photograph information about the image to be processed (e.g., the image with the earliest uploading date and time) in the RAM 203. In step S902, the CPU 201 determines the relationship between a predetermined notification recipient and merchandise recipient set in the delivery table to be processed, and changes the subsequent processing based on the relationship.

If "common schedule relationship" is set as the relationship attribute, the processing proceeds to step S903. In step S903, the CPU 201 determines whether the merchandise recipient has an image similar to the image indicated by the photograph information set as the processing target.

In the exemplary embodiment, the processing of step S903 determines whether an image is similar. More specifically, the CPU 201 detects whether the photograph was photographed by the notification recipient at the same time as the merchandise recipient based on the date and time of the photograph (generation date and time) and on a correlation of, for example, information about the color or brightness of the images.

If it is determined in step S903 that the merchandise recipient has a similar image (YES in step S903), the processing proceeds to step S912 without using this image for the suggested merchandise. This is because the merchandise will be configured using an image that has a different composition or photographic subject to the images that the merchandise recipient has.

On the other hand, if it is determined that the merchandise recipient does not have an image similar to the image corresponding to the photograph information to be processed (NO in step S903), the processing proceeds to step S904. In step S904, the CPU 201 determines whether the image indicated by the photograph information set as the processing target was photographed during the schedule period commonly set by the notification recipient and the merchandise recipient.

If it is determined in step S904 that the photographed date and time are not within the commonly set schedule (NO in step S904), the processing proceeds to step S912 without using this image for the suggested merchandise. This is because the merchandise will be configured using an image that both the notification recipient and the merchandise recipient are related to.

On the other hand, if it is determined in step S904 that the photographed date and time are within the commonly set schedule (YES in step S904), the processing proceeds to step S905.

In step S905, the CPU 201 determines whether the image indicated by the photograph information set as the processing target has been evaluated by the merchandise recipient. This is accomplished by using the user ID of an SNS user who has made a positive evaluation of the image corresponding to this photograph information which is attached to the photograph information.

The CPU 201 determines whether the user ID of the SNS user who positively evaluated the image corresponding to this photograph information matches the ID of the merchandise recipient in the photograph information.

If it is determined in step S905 that the image has not been evaluated by the merchandise recipient (NO in step S905), the processing proceeds to step S906. On the other hand, if it is determined that the photograph information set as the processing target has been evaluated by the merchandise recipient (YES in step S905), the processing proceeds to step S911. In step S911, the CPU 201 performs processing to use the image corresponding to the photograph information to be processed as the merchandise.

In step S911, the CPU 201 writes an ID capable of uniquely identifying the image corresponding to the photograph information to be processed in the delivery table.

In step S906, the CPU 201 determines whether the merchandise recipient is in the image corresponding to the photograph information to be processed. The CPU 201 determines whether the merchandise recipient is in the image by acquiring a profile image from the profile information about the merchandise recipient, and then using known face recognition processing.

If it is determined in step S906 that the merchandise recipient is in the image indicated by the photograph information set as the processing target (YES in step S906), the processing proceeds to step S911. If it is determined that the merchandise recipient is not in this image (NO in step S906), the processing proceeds to step S907.

In step S907, the CPU 201 determines whether the number of times the image indicated by the photograph information set as the processing target has been evaluated on the SNS is greater than or equal to a predetermined number. The CPU 201 performs this processing by acquiring an evaluation number from the photograph information set as the processing target, and determining whether the acquired number exceeds a pre-set predetermined number. This processing can also be performed by using the number of comments about the image or the number of views on the SNS to determine the image evaluation.

If it is determined that number of times the image has been evaluated is greater than or equal to the predetermined number of times (YES in step S907), the processing proceeds to step S911. In step S911, the CPU 201 performs the processing for using the image corresponding to the photograph information to be processed for the merchandise. On the other hand, if it is determined that the number of times the image has been evaluated is less than the predetermined number of times (NO in step S907), the processing proceeds to step S912 without using the image corresponding to the photograph information to be processed for the merchandise.

Further, in step S902, if it is determined that the relationship attribute between the notification recipient and the merchandise recipient is "self", that no relationship is set, or that "message relationship" is set, the processing proceeds to step S908.

In step S908, the CPU 201 determines whether the image indicated by the photograph information set as the processing target was photographed within a period corresponding to the delivery target date. For example, if the delivery target date is the birthday or an anniversary of the merchandise recipient, this period is set as a year since the previous birthday or anniversary.

If it is determined in step S908 that the image indicated by the photograph information set as the processing target was not photographed within a period corresponding to the delivery target date (NO in step S908), the processing proceeds to step S912. If it is determined that the image indicated by the photograph information set as the processing target was photographed within a corresponding period (YES in step S908), the processing proceeds to step S909.

In step S909, similar to step S907, the CPU 201 determines whether the number of times the image indicated by the photograph information set as the processing target has been evaluated on the SNS is greater than or equal to a predetermined value. If it is determined that the number of times the image has been evaluated is greater than or equal to the predetermined value (YES in step S909), the processing proceeds to step S911. If it is determined that the number of times the image has been evaluated is less than the predetermined value (NO in step S909), the processing proceeds to step S912.

Turning back to step S902, if it is determined in step S902 that the relationship attribute between the notification recipient and the merchandise recipient is a "group relationship", the processing proceeds to step S910.

In step S910, based on comment information or tag information about the photograph information set as the processing target, the CPU 201 uses known natural language processing to determine whether information corresponding to a group in which the notification recipient and the merchandise recipient commonly participate is attached.

The processing of step S910 may also be performed by setting a pre-generated keyword corresponding to a group, and determining whether that keyword is attached to a tag or a comment. An example of a keyword corresponding to a group is the actual name of a group.

If it is determined in step S910 that information corresponding to a common participation group is attached to the photograph information set as the processing target (YES in step S910), the processing proceeds to step S911. If it is determined that such information is not attached (NO in step S910), the processing proceeds to step S912.

In step S912, the CPU 201 determines whether the above-described processing for all of the photograph information about the notification recipient has finished. If it is determined that this processing has not finished (NO in step S912), the processing proceeds to step S913. In step S913, the CPU 201 rasterizes, in the RAM 203 for example, the unprocessed image information as a processing target, and re-executes the processing beginning at step S902.

If it is determined that the above-described processing for all of the photograph information has finished (YES in step S912), the CPU 201 ends the processing.

As described above, based on a relationship between the user (notification recipient), who is the person sending the merchandise, and the merchandise recipient, who is the person receiving the merchandise, an image may be desired by the merchandise recipient can be automatically selected. Further, merchandise can be generated by determining the photographed period corresponding to the delivery date and time, and using an image photographed within that period.

For example, a user can give photographs taken during a trip in the form of an album to a friend who went on the trip together with the user. Further, since the image to be used as the merchandise can be automatically selected using evaluations of a photograph on an SNS, well-taken images can be used as merchandise without the need for a complicated selection operation by the user.

The image acquisition processing based on a determined relationship as described in the exemplary embodiment is merely an example. An image can be set appropriately based on the relationship, such as an image in which either just the user is in or an image in which both the user and the merchandise recipient are in.

After an image is selected, the server apparatus 102 determines the photograph merchandise type. The photograph merchandise type changes based on the number of pieces of content to be used. For example, for one or a few pieces of content, the merchandise may be a poster. For several content pieces, the merchandise may be an album. And if there are a large number of content pieces, the merchandise may be a slideshow.

The photograph merchandise type can also be changed based on the relationship between the notification recipient and the merchandise recipient. For example, in the case of an album, an opulently bound object having a large number of pages can be used as the merchandise for a relationship having a high level of intimacy (e.g., a common schedule relationship), while for a person with a lower level of intimacy (e.g., no relationship setting), a more simply bound object having fewer pages can be used.

While the exemplary embodiment describes that the content selection criteria when the relationship between the notification recipient and the merchandise recipient is set to "message relationship" is handled in the same manner when a relationship is not set, a content selection criteria specific to "message relationship" can also be provided.

For example, a keyword that frequently appears in messages exchanged between the notification recipient and the merchandise recipient can be extracted, and content having that keyword as a tag can be selected.

A function configuration for realizing the processing performed by an information processing apparatus according to the above-described exemplary embodiment will now be described with reference to FIG. 16.

In the exemplary embodiment, the respective function configurations illustrated in FIG. 2 are realized by the CPU 201 executing a control program to perform information calculation processing and control the respective hardware units. However, a part or even all of the function configurations illustrated in FIG. 16 can also be realized as hardware.

Figure 16:
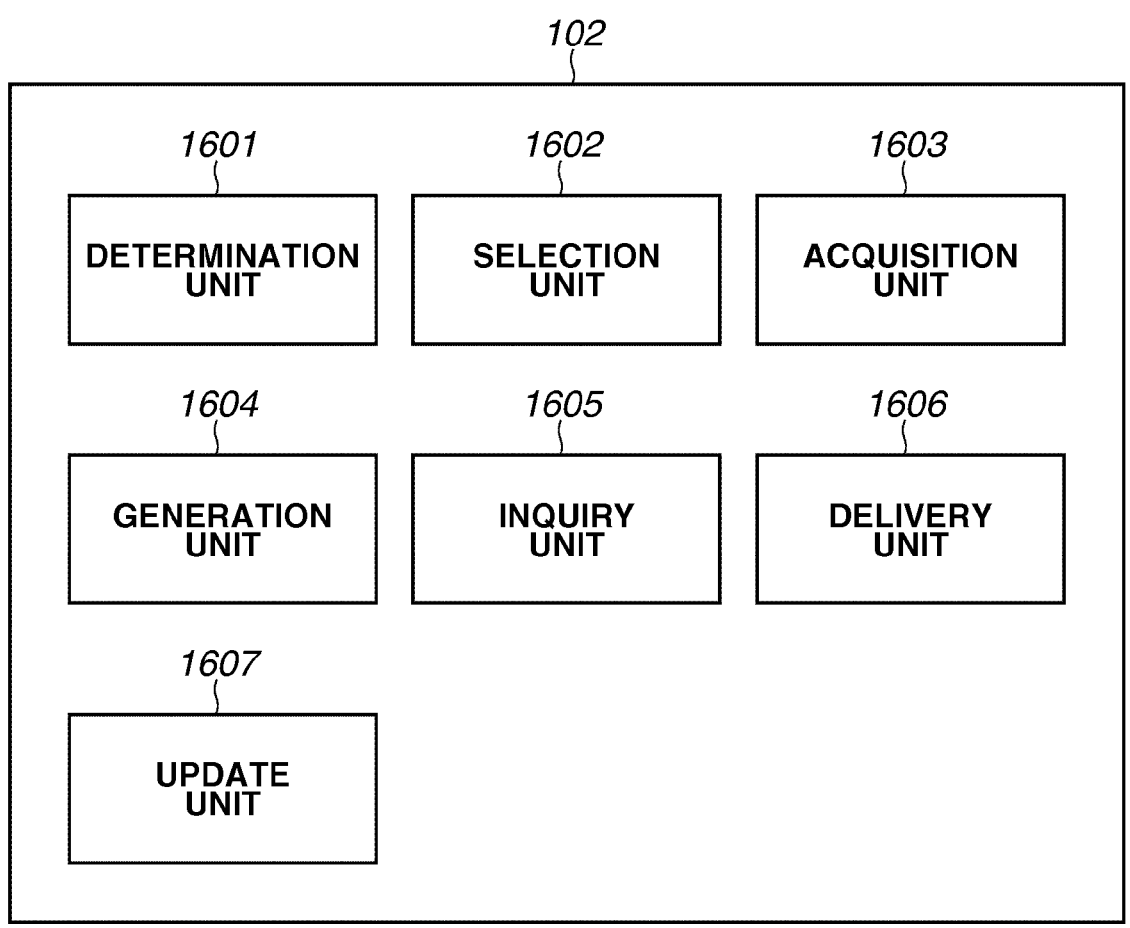
FIG. 16 is a block diagram illustrating a function configuration of the information processing apparatus according to an exemplary embodiment.

In FIG. 16, a determination unit 1601 determines the relationship between the user and the person receiving the content based on information indicating activity by the user on the network. A selection unit 1602 selects a piece of content from among the content uploaded onto the SNS based on a content selection condition that is based on the relationship between the user and the person receiving the content determined by the determination unit 1601.

An acquisition unit 1603 acquires information indicating activity by the user on the network to be used by the determination unit 1601 to determine the user and the person receiving the content.

A generation unit 1604 generates the content to be delivered based on the content selected by the selection unit 1602. For example, the generation unit 1604 lays out images selected by the selection unit 1602 and generates an album.

An inquiry unit 1605 inquires whether to approve execution of content delivery to the user by providing a preview of the content generated by the generation unit 1604. A delivery unit 1606 delivers the generated content.

An update unit 1607 updates the SNS information based on information about the image used in the content delivered by the delivery unit 1606.

Based on the above series of processes, a photograph merchandise delivery table is completed in which the respective items in the photograph merchandise delivery table are automatically determined. Further, an interpersonal relationship can be determined based on information indicating activity by the user on the network of the SNS, and content can be automatically selected based on that relationship.

Therefore, the user can send content that is appropriate for the person to whom the photograph merchandise is to be given without having to input the required items for receiving the photograph merchandise. Further, since merchandise is suggested to the user at an appropriate timing based on profile and schedule information, this system is convenient for the user.

In the above-described exemplary embodiment, all of the people set as friends were set as merchandise recipients. However, the system may also be configured so that a preference affinity level and an intimacy level with the people set as a list of friends are calculated based on information indicating activity on the network of the SNS, and users meeting a condition relating to the preference affinity and intimacy levels from among the friends are set as merchandise recipients.

For example, the number of groups that the user and a person set as a friend commonly participate in, or the ratio of groups that both the user and the person set as a friend commonly participate in among the total number of groups that the user participates in, can be calculated as an affinity level, and this calculated value may be utilized to determine the merchandise recipient or the used content.

Figure 7:
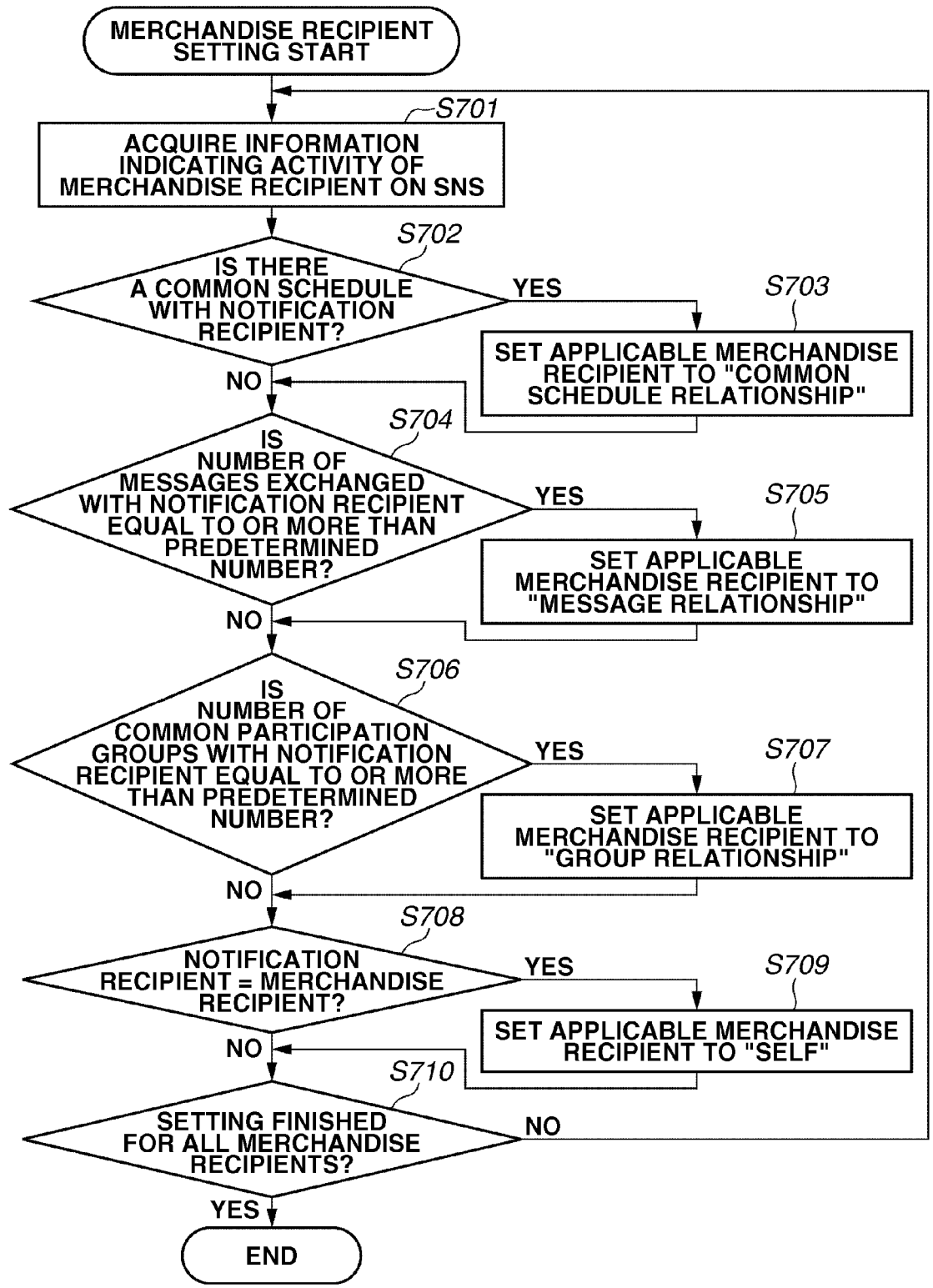
FIG. 7 is a flowchart illustrating processing for setting an association with a merchandise recipient.

Further, the level of intimacy with the friend may be calculated using the processing of step S704 illustrated in FIG. 7 that is performed to determine the message relationship.

If, for example, the ratio of the number of messages with a specific friend in the total number of messages sent and received is taken as the level of intimacy with that friend, the calculated level of intimacy can be utilized to determine the merchandise recipient or the used content.

In addition, the preference affinity level and intimacy level may also be determined using, for example, the ratio of users commonly included in a friend list, the ratio of tags commonly attached to photographs, the ratio of common participation events, and the number of times or the duration that users viewed each other's diary or profile.

An example of determining merchandise recipients using levels of preference affinity and intimacy is to set only users having the highest preference affinity level or intimacy level from the list of friends as merchandise recipients. Another example is to set only friends having a preference affinity level or intimacy level equal to or more than a predetermined number as the merchandise recipients.

The used content may also be determined using a preference affinity level and an intimacy level. For example, as an example of determining the content using a preference affinity level or intimacy level, a weighting can be given to evaluations from the friend with relatively high preference affinity level or intimacy level. Consequently, a merchandise recipient and used content are determined that reflect the levels of intimacy and preference affinity among the users.

In the exemplary embodiment, a person who appears in the information indicating activity by the user on the network with a frequency greater than or equal to a predetermined value may also be set as a merchandise recipient.

For example, if the number of photographs that a target person is in among the photographs uploaded onto the SNS by the user, or the name of a target person included in a diary article is greater than or equal to a predetermined value, then that user is set as a merchandise recipient. In this case, if the user set as the merchandise recipient is not a registered user on the SNS, the notification recipient has to deliver the merchandise to the merchandise recipient.

In addition, in the exemplary embodiment, consideration may be given to a plurality of merchandise recipients in the used photograph determination processing illustrated in FIG. 9 by setting a plurality of people as merchandise recipients.

For example, merchandise corresponding to a plurality of people can be generated at a time even for merchandise using the same content by, for example, determining in the processing of step S906 whether at least two or more merchandise recipients are included in a photograph.

Moreover, in the processing for determining the photograph to be used, a known photograph analysis technology can be used. For example, a photograph having the same color hue or scene may be selected from photographs of the merchandise recipient. Consequently, photograph merchandise can be generated using an image with a style thought to be preferred by the merchandise recipient.

Still further, the selection criteria for the content may be changed based on the preference affinity level and intimacy level. For example, the selection criteria can be set so that an image with a higher resolution is selected the higher the preference affinity level and intimacy level are.

According to the above exemplary embodiment, content can be automatically suggested using content information and a friendship relationship between the profile or schedule information included in personal information about a user on the SNS and another user on the SNS.

Therefore, at the appropriate timing, the content subject matter can be suggested to the person who is to receive the content while reducing the burden on the user. Further, by uploading the generated photograph merchandise onto the SNS, user activity on the SNS can be promoted.

Aspects of the present invention can also be realized by a computer of a system or apparatus (or devices such as a CPU or MPU) that reads out and executes a program recorded on a memory device (computer-readable storage medium) to perform the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-151437 filed Jul. 8, 2011, which is hereby incorporated by reference herein in its entirety.

What is claimed is:

1. An information processing apparatus comprising:
a memory; and
a processor, connected to the memory, the processor configured to control:
a determination unit configured to determine a relationship between a user and a person;
a selection unit configured to select a content from a plurality of contents stored and associated with the user according the relationship determined by the determination unit and a plurality of contents stored and associated with the person; and
a recommendation unit configured to recommend the content selected by the selection unit as content to be provided to the person.

2. The information processing apparatus according to claim 1, wherein the processor is further configured to control an acquisition unit configured to acquire information indicating activity by a user on a network,
wherein the determination unit is configured to determine the relationship between the user and the person based on the information indicating activity by the user on the network.

3. The information processing apparatus according to claim 1, wherein the determination unit is configured to determine the relationship between the user and the person based on at least one of a message sent or received by the user, a schedule registered by the user, an evaluation of the content, and an attribute of the user.

4. The information processing apparatus according to claim 1, wherein the selection unit is configured to select the content when the content includes an attribute matching a selection condition based on the relationship determined by the determination unit.

5. The information processing apparatus according to claim 1,
wherein the content is an image, and
wherein the selection unit is configured to select an image that includes the user or the person based on the relationship determined by the determination unit.

6. The information processing apparatus according to claim 1, wherein the selection unit is configured to select the content using a generation date and time based on the relationship determined by the determination unit.

7. The information processing apparatus according to claim 1, wherein the processor is further configured to control a layout unit configured to lay out the content selected by the selection unit,
wherein the delivery unit is configured to deliver content laid out by the layout unit.

8. The information processing apparatus according to claim 1, wherein the processor is further configured to control an inquiry unit configured to provide a preview of the content to be delivered and to provide the user an opportunity to approve or disapprove delivery by the delivery unit.

9. The information processing apparatus according to claim 1, wherein the user and the person are the same.

10. The information processing apparatus according to claim 1, wherein the selection unit is configured to select a content that is not similar to the plurality of contents stored and associated with the person from the plurality of contents stored and associated with the user according to the relationship determined by the determination unit.

11. A method for controlling an information processing apparatus, the method comprising:
determining a relationship between a user and a person;
selecting a content from a plurality of contents stored and associated with the user according to the determined relationship and a plurality of contents stored and associated with the person; and
recommending the selected content as content to be provided to the person.

12. A non-transitory computer-readable storage medium that stores a program for causing an information processing apparatus to execute the control method according to claim 11.

* * * * *